United States Patent

[11] 3,542,067

| [72] | Inventor | Robert R. Douglas<br>Philadelphia, Pennsylvania |
| --- | --- | --- |
| [21] | Appl. No. | 751,125 |
| [22] | Filed | Aug. 8, 1968<br>Continuation of Ser. No. 509,760, Nov. 24, 1965, abandoned. |
| [45] | Patented | Nov. 24, 1970 |
| [73] | Assignee | Amercon corporation<br>Philadelphia, Pennsylvania<br>a corporation of Delaware. by mesne assignments |

[54] CONTROL VALVE
3 Claims, 1 Drawing Fig.

[52] U.S. Cl.................................................137/614.11,
                                                      137/614.19
[51] Int. Cl....................................................F16k 17/06,
                                                      F16k 17/10
[50] Field of Search............................................137/614.19,
                                                      614.2, 614.11

[56] References Cited
UNITED STATES PATENTS
1,660,842  2/1928  Hoesel........................  137/614.19

*Primary Examiner*—Alan Cohan
*Assistant Examiner*—Howard M. Cohn
*Attorney*—Busser, Smith & Harding ABSTRACT: A control valve for fuel oil systems includes a first valve, operated by a pressure-responsive diaphragm, which automatically shuts off flow in case of a pipe rupture on the downstream side, and which regulates pressure. A second valve, operated by the same pressure-responsive diaphragm, automatically shuts off flow of oil in the event of leakage past the first valve, if the pressure exceeds a predetermined maximum.

Patented Nov. 24, 1970
3,542,067
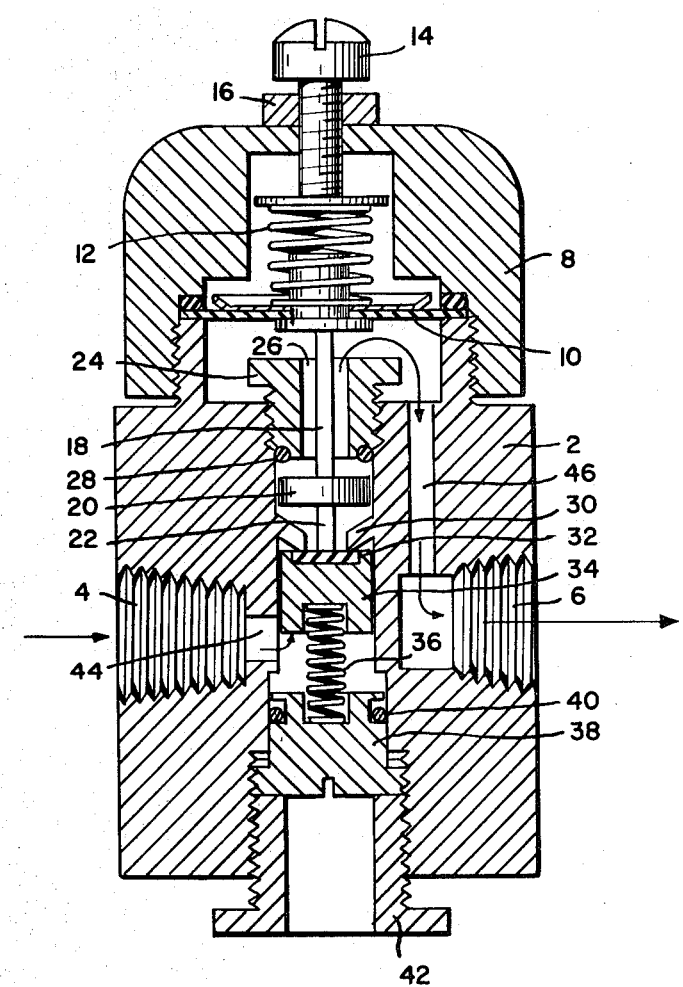
INVENTOR
ROBERT R. DOUGLAS
BY
*Busser, Smith & Harding*
ATTORNEYS

CONTROL VALVE

CROSS-REFERENCE TO RELATED APPLICATION

This is a continuation of my application, Ser. No. 509,760, filed Nov. 26, 1965, now abandoned.

BACKGROUND OF THE INVENTION

This invention relates to control valves and particularly to the type meeting safety requirements for domestic centralized fuel oil systems.

In what is referred to as a centralized fuel oil system, the oil is delivered from a single supply tank under pressure to lines running individually to homes, trailers, or the like. Each of these lines includes a filter and a meter through which the oil is delivered to a burner. Included in the individual lines must be safety devices to eliminate the possibilities of overflow or leakage which could be a fire hazard. Present requirements are typically the following:

The fluid flow must be cutoff in the case of any rupture in the line. Pressure must be controlled to some maximum, for example, 3 pounds per square inch, for delivery to the burner. Automatic shut-off must occur if the line pressure exceeds, at the appliance, some maximum, for example 8 pounds per square inch. The last requirement need not involve manual reset if the pressure control is of the fail-safe type.

In addition to the foregoing there is a requirement of a heat-sensitive shut-off valve which will close in the event of overheating indicative of fire.

SUMMARY OF THE INVENTION

Heretofore these requirements have been met by comparatively elaborate control devices, and it is the broad object of the present invention to provide a relatively simple and compact valve to take care of the safety functions other than that of heat sensitivity.

In brief, the valve provided in accordance with the present invention has the following characteristics:

Flow of fuel will occur only when the burner pump is operating to draw a vacuum on the supply line. Since operation is thus on the subatmospheric side, the requirement relative to a limited supply pressure is met.

The requirement relative to leakage is also met since a vacuum capable of producing flow will not exist if rupture occurs in any part of the system between the valve and the burner.

Provision is also made to shut off the flow in the event of any failure of the vacuum system if the pressure rises to the maximum permissible. Upstream pressure assists closure of the flow line and, as will appear, there is a series arrangement of a pair of control systems which from the standpoint of safety are additive in their results.

While meeting the safety requirements above outlined involves operation in a subatmospheric range, for other uses the same valve, with spring force adjustments, may operate at pressures above atmospheric, as will be hereafter apparent.

The foregoing general object as well as other objects relating to details of construction and operation will become apparent from the following description, read in conjunction with the accompanying drawing.

BRIEF DESCRIPTION OF THE DRAWING

The single FIG. is an axial section through a valve constituting a preferred embodiment of the invention.

DESCRIPTION OF THE PREFERRED EMBODIMENT

The valve comprises a main body 2 provided with a central opening and with the inlet and outlet passages 4 and 6 conventionally threaded for connection to piping. A flexible diaphragm 10 is secured at its periphery by a bonnet 8, and is urged downwardly by a compression spring 12, the pressure of which is adjustable through a screw 14 locked in adjusted position by a nut 16. Secured to the central part of the diaphragm assembly is a downwardly extending stem 18 provided with a valve disc 20 and a lower stem extension 22. A fitting 24 having an enlarged central opening 26 through which the rod 18 extends serves to support a seat 28 provided by an O-ring engageable by the valve disc 20 when it moves sufficiently upwardly. The disc 20 has clearance with the bore in which it moves so that the fuel may pass its periphery.

This bore is provided with a seat 30 defining an opening of reduced diameter, with which seat there cooperates the valve member 32 of soft material such as a synthetic rubber of a type unaffected by the fuel oil. This valve member 32 is supported by a rigid metallic body 34 which has peripheral clearance with the bore extension in which it moves. A compression spring 36 urges the member 34 upwardly, and the force exerted by this spring is adjustable by movement of a member 38 threaded into the body 2 and provided with an O-ring packing 40 to prevent leakage. A locking screw 42 is provided to hold the member 38 in its adjusted position. The inlet opening 4 communicates with the bore extension containing the member 34 through a passage 44. The region below the diaphragm 10 communicates through a passage 46 with the outlet passage 6.

The operation of what has been described is as follows:

With the burner not operating, pressure from the supply introduced at 4 is applied under the member 34 which is urged upwardly by the spring 36 to close the contact between the valve member 32 and the seat 30, adjustments being made so that the force exerted by the spring 12 is insufficient to overcome the force exerted by the spring 36, the stem extension 22 engaging the valve 32 at this time.

In the event that any leakage occurred between the valve member 32 and seat 30, the supply pressure would be applied to the region below the diaphragm 10, and adjustment of the spring 12 is so made that this pressure would move the diaphragm upwardly to cause the valve disc 20 to seat against the O-ring 28 closing off the flow. This adjustment, for example, may be such that the closure just mentioned will occur in the event that the pressure below the diaphragm reaches or exceeds the maximum permissible pressure such as 8 pounds per square inch. The diaphragm is responsive to pressure on the downstream side of the valve when disc 20 engages O-ring 28. Disc 20 is held against O-ring 28 positively when downstream pressure exceeds the maximum permissible pressure. The force transmitted to disc 20 by the diaphragm through rod 18 is proportional to downstream pressure so that higher downstream pressures effect tighter closure of the valve. It will be seen that the conditions just mentioned are such that the valves 32 and 20 are effectively in series so that they have an additive effect in blocking the flow.

When the burner starts operating, its pump will draw a vacuum through the outlet passage 6 resulting in a downward movement of the diaphragm 10, augmenting the downward pressure applied by the spring 12, to cause the stem extension 22 to move the valve 32 downwardly to provide opening thereof and permit flow of the fuel to the burner as required. The large area of the diaphragm compared with the small area inside the seat 30 insures this opening against the force of the spring 36 and the force resulting from the pressure difference across the valve 32, 34. The setting of the spring 36 is such as to require a certain predetermined degree of vacuum to permit this opening of the valve 32. Whenever the burner ceases operation, the production of the vacuum will cease and the inlet pressure will produce a pressure rise below the diaphragm restoring the valve member 32 to its closed position. Thus the flow will be cut off, under ordinary conditions, whenever the burner stops operation. In view of this, there is satisfied any requirement that the pressure be below any limit of positive pressure during operation.

In the event that there is any leakage on the downstream side of the valve assembly, no vacuum will be drawn by the burner pump and, consequently, the valve 32 will either close or remain closed, the burner pump sucking air through the rupture.

It will be evident from the foregoing that the device is of a fail-safe nature, the upstream pressure tending to hold closed the valve 32 whenever it is closed.

The valve assembly just described is desirably downstream of the filter in the system to maintain the component valves free of dirt. The associated meter may be either upstream or downstream of the valve assembly.

While, for closure of the valve in the case of rupture of the downstream system, opening should occur only under conditions of subatmospheric pressure, the valve assembly which has been described may be used as a pressure regulator with the feature of positively closing off the flow in the event that there is a failure of the valve member 32 to seat positively. For this purpose, the springs may be so adjusted that the valve member 32 is held away from its seat to permit flow so long as the pressure beneath the diaphragm 10 is less than some predetermined value which may exceed atmospheric pressure. This pressure will be a maximum controlled pressure, and if the pressure rises above this value, the valve member 32 will seat to interrupt flow. If it fails to do so and the pressure rises to a still higher value, the valve 20 will seat and interrupt flow.

I claim:

1. A valve assembly comprising a housing providing a liquid flow passage having upstream and downstream ends with respect to forward flow therethrough, a first valve member in said passage to control flow therethrough, said valve member being moveable in the direction of forward flow to prevent flow and in the opposite direction to permit flow, a spring urging said valve member toward its flow-preventing position, a diaphragm moveable in response to pressure at the downstream end of the flow passage, means responsive to movement of said diaphragm for moving said first valve member against the force of said spring and pressure exerted by the liquid upstream of the first valve member to permit flow when the pressure at the downstream end of the flow passage falls below a first predetermined value, a valve seat within said passage, and a second normally open valve member arranged to cooperate with said seat, means connecting said second valve member to said diaphragm so that said diaphragm can exert a force, through said connecting means, urging said second valve member against said seat with a force which increases the pressure at the downstream end of the flow passage when said pressure exceeds a second predetermined value to prevent flow through said passage resulting from leakage past said first valve member.

2. An assembly according to claim 1 in which the force exerted by said spring is adjustable.

3. An assembly according to claim 1 in which said diaphragm effects opening of the first valve member only when the pressure at the downstream end of the flow passage is subatmospheric.